No. 709,747. Patented Sept. 23, 1902.
J. J. COOK.
TAKE-UP DEVICE FOR AXLE SPINDLES.
(Application filed Oct. 30, 1900. Renewed July 11, 1902.)
(No Model.)
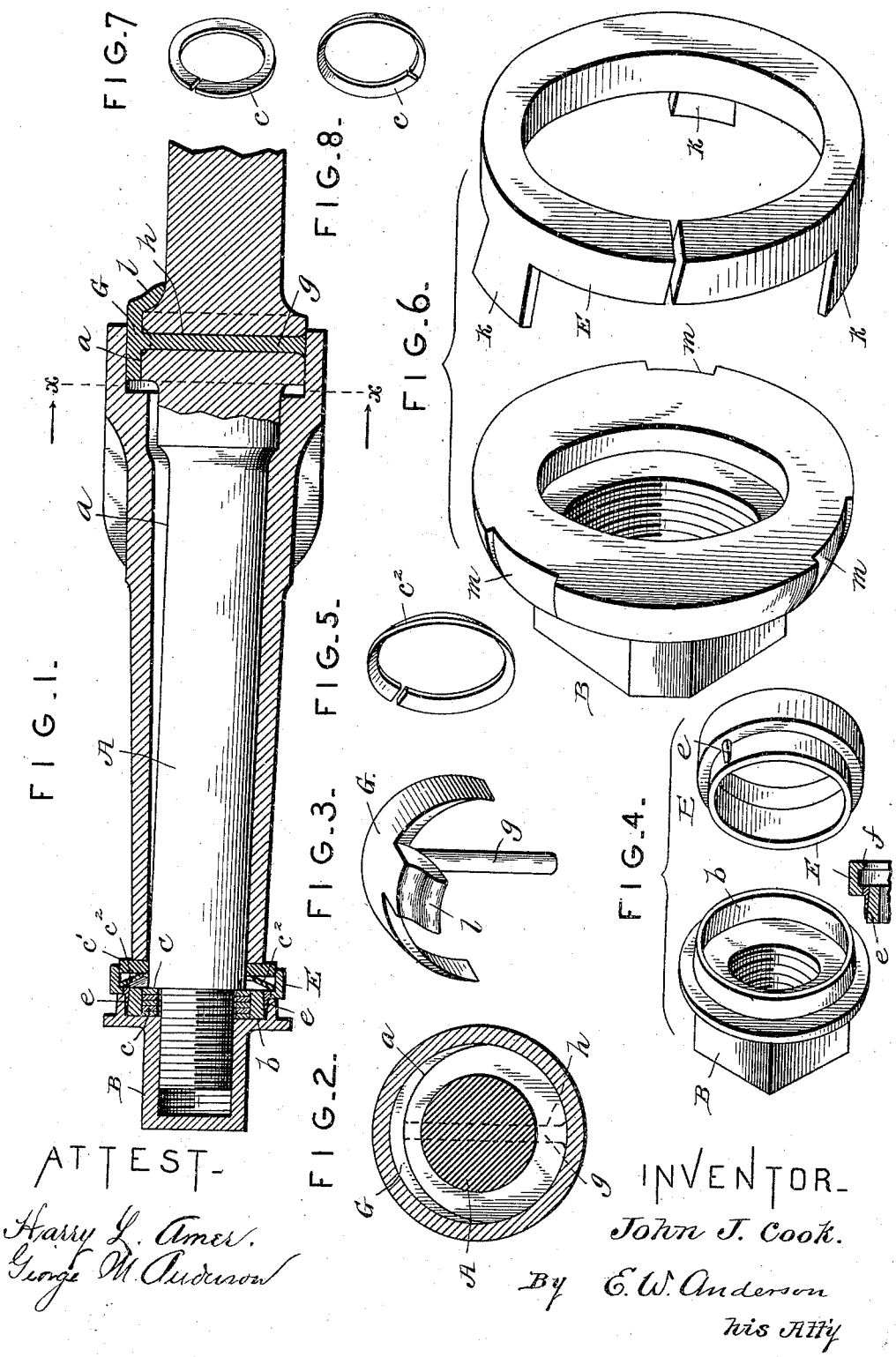
ATTEST-
Harry L. Ames.
George M. Anderson
INVENTOR-
John J. Cook.
By E. W. Anderson
his Atty
THE NORRIS PETERS CO., PHOTO-LITHO., WASHINGTON, D. C.

UNITED STATES PATENT OFFICE.

JOHN J. COOK, OF COLUMBUS CITY, IOWA.

TAKE-UP DEVICE FOR AXLE-SPINDLES.

SPECIFICATION forming part of Letters Patent No. 709,747, dated September 23, 1902.

Application filed October 30, 1900. Renewed July 11, 1902. Serial No. 115,218. (No model.)

*To all whom it may concern:*

Be it known that I, JOHN J. COOK, a citizen of the United States, and a resident of Columbus City, in the county of Louisa and State of Iowa, have made a certain new and useful Invention in Devices for Taking up Wear in Worn Axle-Spindles; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a central longitudinal section showing my invention as applied. Fig. 2 is a section on the line $x\ x$, Fig. 1. Fig. 3 is a detail view of wear-plate G. Fig. 4 shows detail views illustrating the joint between parts B and E. Fig. 5 is a detail view of washer $c^2$. Fig. 6 illustrates another form of joint between parts B and E. Fig. 7 illustrates two forms of washers $c$.

The invention has relation to axle-spindles, and it consists in the novel construction and combination of parts, as hereinafter set forth.

The object of the invention is to promote the duration of the spindle by taking up the play due from wear.

In the accompanying drawings the letter A designates a spindle worn at certain parts, (indicated at $a$.)

B represents the spindle-nut, and C the shoulder of the spindle.

In the nut B is formed a recess $b$, which is of annular form around the opening of the threaded portion, said recess being of larger diameter at its bottom than at its marginal portion.

In the recess $b$ are placed thin washers $c$, which may be preferably spring-washers, each washer being cut in such manner as to allow it to spring or be spread open a little in the recess, so that it will hold its position therein. When the spindle becomes a little worn, one of these thin washers can be taken out of the recess, and this will allow the nut to be screwed on the end of the spindle a little farther toward the collar, thereby pressing the hub or boxing against the shoulder of the spindle.

It is well known that the boxing in the hub wears more on the outer end near the end of the spindle, and after the boxing becomes worn to some extent there is a good deal of play and the wheel takes a wabbling motion in running. This causes the back portion of the boxing to wear, as well as the spindle, when the back end of the boxing strikes it. The spindle in this manner is rapidly worn smaller in diameter in the portion toward the shoulder than it is at the end portion.

For nuts already in use I desire to provide a face attachment or recessed collar, (indicated at E,) which is secured to the nut by means of lateral ribs or pins at $e\ e$. In this collar the washer-opening is made with a tapering wall, as hereinbefore set forth in reference to the annular recess $b$ of the nut, or it may have a very small interior marginal flange $f$, which will serve to prevent the thin washers from dropping out of the opening or recess. When these face-collars for the nut are cast of malleable iron, small ribs may be cast on the collar, which will serve instead of the pins $e$. These ribs or pins are crowded into the flanged face of the nut with the attachment and serve to clench or secure the latter in position, preventing it from turning in the seat formed by the flange. When the spindle is badly worn, I use an arched wear-plate G on the shoulder portion, this wear-plate G being provided with a pin or peg $g$, which is inserted in a perforation or seat $h$, made in the axle, and serves to hold the wear-plate therein, its position being further secured by means of a hook-lug $l$, which engages the back of the shoulder portion of the axle. This wear-plate is placed on the upper part of the spindle-shoulder, and serves to keep the hub of the wheel in its normal position against the bottom or under side of the spindle, thereby providing for proper relation of the parts when the wheel is in action. This wear-plate is designed to fill the place of the worn part on the shoulder of the spindle, so that it will fit neatly in the back or flanged recess of the boxing.

Instead of using cut washers, the washers may be made entire in annular form, but slightly dished, as shown in Fig. 8, so that when pressed in the nut-recess they will spread sufficiently to be held in position.

For the large open nuts of wagons, the collar or face attachment may be made with lugs, as indicated at $k$, these lugs $k$ extending at right angles to the face of the attachment and being designed to engage recesses $m$, formed in the flange of the nut, in connection with which they may be clenched in position, so as to secure the face attachment and nut together. This collar or face attachment is usually a cleft annulus, being so made in order that it may be more readily adjusted to nuts of varying size.

In the manner hereinbefore described it is designed to provide for taking up the wear of spindles principally by means of the adjustable collar attachment with which the nut is provided, and when the spindle is badly worn the shoulder wear-plate is also used.

I may employ in connection with the leather washer $c'$ a washer $c^2$ of dished form, which will spring laterally or be put under tension when the nut is screwed home upon the spindle. This will maintain a tight fit of the shoulder of the nut against the shoulder of the spindle for a greater length of time without readjustment of the nut and prevents rattling or play of the wheel.

As a substitute for the leather washer $c'$ I may employ a washer of Babbitt metal or brass.

Having described this invention, what I claim, and desire to secure by Letters Patent, is—

1. In devices for taking up wear in worn axle-spindles, the nut having a recessed inner face provided with a series of removable washers therein arranged to bear against the shoulder of the spindle, said nut having also a second recess in its inner face, and provided with a spring-washer arranged to bear against the shoulder of the boxing, substantially as specified.

2. In a device for taking up wear in axle-spindles, the combination with the nut engaging the end of said spindle, and having a recess in its inner face, of a face attachment for said nut, having also a recess in its inner face, and the washers in said recesses, arranged to bear against shoulders of the spindle and boxing, substantially as specified.

In testimony whereof I affix my signature in presence of two witnesses.

JOHN J. COOK.

Witnesses:
M. ROBERT UTT,
HENRY ALBURN.